Nov. 8, 1927.  1,648,700
D. T. SIMONDS
THERMAL ELECTRIC GENERATOR
Filed March 31, 1925
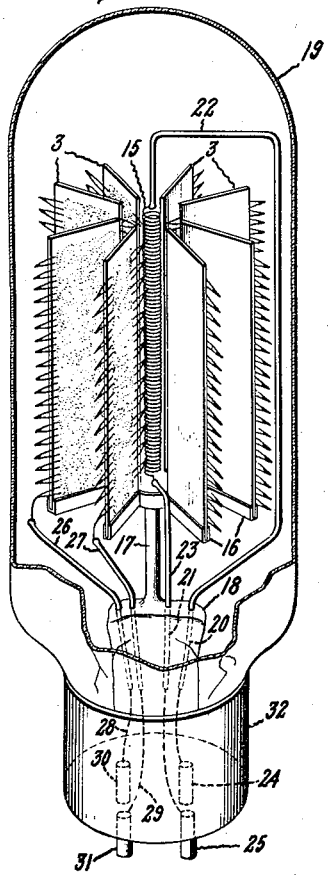
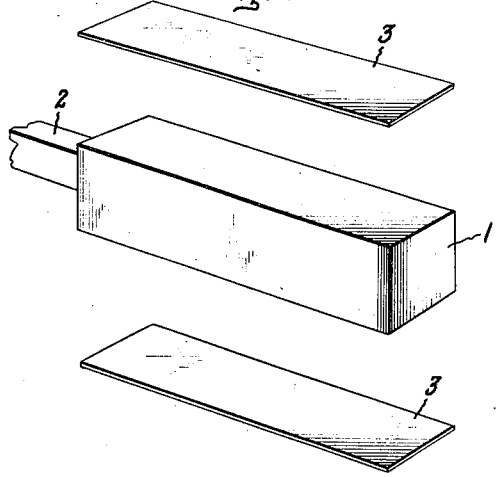
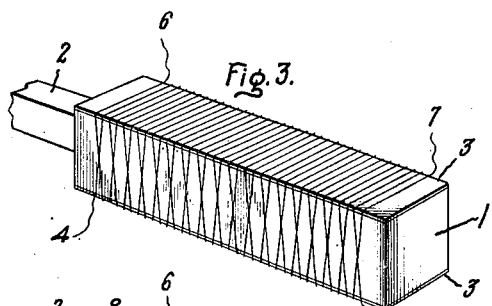
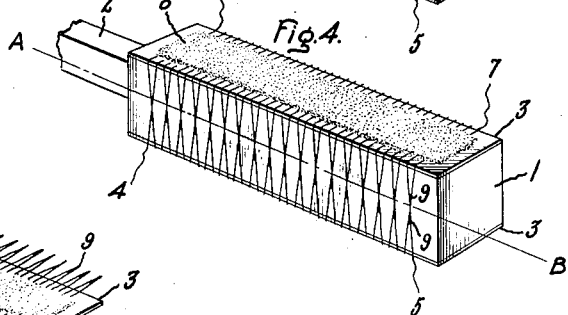
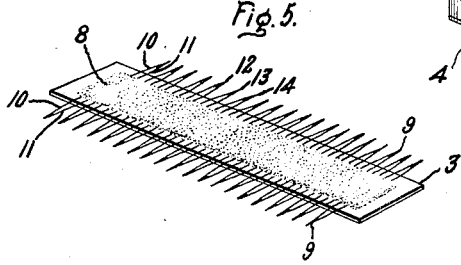
Inventor:
Dewey T. Simonds,
by *Alexander S. Lunt*
His Attorney Patented Nov. 8, 1927.

1,648,700

UNITED STATES PATENT OFFICE.

DEWEY T. SIMONDS, OF SCHENECTADY, NEW YORK, ASSIGNOR TO GENERAL ELECTRIC COMPANY, A CORPORATION OF NEW YORK.

THERMAL ELECTRIC GENERATOR.

Application filed March 31, 1925. Serial No. 19,678.

The present invention relates to generators of electric current and more particularly to thermal electric generators.

My invention has for its general object to improve and simplify the construction of apparatus of this kind, so that the same will be dependable and efficient in operation and comparatively inexpensive to manufacture.

One object of the invention is to provide a thermal electric generator which is mounted within a vitreous container or analogous receptacle after the fashion of an incandescent lamp and whose elements are protected from damage and deteriorating operating influences.

Another object of my invention is to provide means whereby the generator may be inserted in and withdrawn from a socket or similar receiving device so that it may be used without the use of adapters or auxiliary connecting means.

A further object of my invention is to construct a thermal electric generator which may be used as a substitute for the batteries ordinarily employed in radio receiving sets.

A still further object of my invention is to provide a thermal electric generator whose elements may be manufactured in large quantities and whose structure may be heated and cooled in such a way as to produce a current of maximum strength in an apparatus of minimum size.

With these and other objects in view as will more fully hereinafter appear, the invention consists in the features of construction and arrangement of parts illustrated in the accompanying drawing and pointed out in the appended claims.

Thermal electric generators as usually constructed consist of a large number of interconnected individual units composed of thermocouples made up of contacted or joined plates, bars or wires of dissimilar metals. Such couples when assembled in circuit relation with their hot junction ends exposed to a source of heat are capable of generating electric current. Considerable difficulty has been experienced, however, in producing generators of this type owing to the great numbers of couples required to produce an appreciable amount of current and the expense attending the manufacture and assembly of the current producing units.

Furthermore after thermocouples of the ordinary type have been used for some time it is found that the joints deteriorate owing to exposure to heat and air so that the output of the generator is diminished. Prolonged operation will cause the elements to deteriorate to such an extent as to render the device practically useless.

These disadvantages are obviated in the thermal electric generator of the present invention in a manner hereinafter set forth in detail.

In the accompanying drawing in which similar numerals of reference indicate corresponding parts throughout the several views.

Figure 1 illustrates a thermal electric generator constructed in accordance with my invention.

Figure 2 shows a form of jig suitable for forming the current producing elements of the generator.

Figure 3 designates a preliminary stage in the construction of the elements.

Figure 4 shows a subsequent stage in the manufacture of the elements.

Figure 5 is a view of one of the individual current producing units.

In describing the generator of my invention the process of fabricating the individual curent producing units will be described first.

These units consist of members of interconnected thermocouples having strips, bars, plates, or wires of one metal as their positive elements and similarly shaped members of another metal as their negative elements.

Various metals and alloys may be used for forming the positive and negative elements. I may for example use the alloys described in the United States Patent No. 781,288 to Marsh in which one element of a thermocouple is made of an alloy of 90% nickle and 10% chromium and the other element consists of an alloy of 65% copper and 35% nickel. However, alloys such as "calorite" composed of nickel 65, chromium 12, iron 15, manganese 8 and "advance" composed of nickle 44, manganese .75, the balance being nickel may be used, but it is to be understood that any co-acting heat resisting metals of the so-called "thermoelectric" series whose electrical resistance is not excessive when made up into wires, bars or strips may be used without departing from the spirit of the invention.

Figure 2 shows a type of tool which may be used in the manufacture of the thermocouples. 1 represents a mandrel made of bakelite or other suitable material and which is provided with a lug 2 by means of which it may be mounted in the chuck of a lathe. Plates 3 of mica or other heat resisting insulating material are placed upon two opposite faces of the mandrel 1 (two faces being left free) whereupon wire, strip or foil of one metal, say that destined to constitute the negative element is wound upon the mandrel beginning from the left and as indicated at 4, proceeding toward the right hand end and terminating at 7 as shown in Figure 3 so as to produce in effect a right hand thread. The thickness of the wire or strip used is of course dependent upon the thermoelectric efficiency of the metals chosen. A similar layer of metal but composed of the alloy destined to constitute the positive element is wound over and upon the first layer in the form of a left hand thread beginning at the right hand end 5, proceeding toward the left and terminating at 6, the winding being effected by rotating the mandrel and applying the metal in such a manner that the layers cross only on the two faces of the mandrel not provided with mica plates and remain substantially parallel on the other faces.

Instead of winding wires or draping rods or strips of metal upon the mandrel it is possible to apply the metal by spraying it thereupon by means of a Schoop gun mounted upon and advanced by the automatic feed of the lathe. One layer of metal of any desired thickness may hus be sprayed in place and the feed reversed when the layer of the second metal is to be applied.

The metal layers may then be fastened to the mica plates by means of any suitable binder, fusible and relatively heat resisting materials such as vitreous glazes, glass, or lead borate, etc. indicated by 8, being particularly adapted for this purpose.

The metal layers are thereupon integrally united at their crossing points in any suitable manner. In the preferred embodiment of my invention the entire structure shown in Figure 4 and comprising the mandrel 1, mica plates 3 and crossed metal windings is transferred to a plating bath and sufficient metal, preferably copper, is allowed to deposit to unite the metal layers as shown at 9. A suitable stopping-off varnish may be used to prevent undesired deposition of metal upon other parts of the structure. It is also possible to unite the layers at their crossed portions by welding. This may readily be accomplished by inserting a metal rod as a welding electrode beneath the crossed portions in a groove (not shown) in the mandrel, attaching the electrode to one pole of the welding current source and passing a metal electrode connected to the other pole over the crossed metal layers so as to press them in contact with the first mentioned welding electrode.

After the metal windings are metallically united at their crossed portions by electrodeposition or welding the metal structure with its adhering refractory and insulating plates is slipped off the mandrel, a procedure which may be facilitated by either using a slightly tapered mandrel or inserting a removable tongue therin before applying the windings, in a manner not illustrated in the drawing but well known in the coil winding art.

The removed structure will appear as a sort of cage having two opposite sides formed of refractory plates with metal layers cemented thereto and two opposite sides formed of crossed and united X-shaped metal members.

The crossed and united X-shaped metal layers are then cut along the line A B of Figure 4 and the V-shaped members extending perpendicularly from the refractory plates 3 are bent so as to extend outwardly from and to lie in the same plane as the refractory plate 3.

The structure so obtained and illustrated in Figure 5 constitutes one of the current producing units. It is apparent that this consists of a plurality of individual thermocouples composed of alternating members 10, 11 of dissimilar metals disposed in zig-zag fashion whose metallically joined points 12, 13, 14, etc., project outwardly from the edge of the refractory support in a line parallel to the edges thereof. One series of such points is destined to serve as the hot junction of the thermopile and the other as the cold junction.

Any desired number of such current producing units may be disposed in thermoelectric relation around a source of heat. As shown in Figure 1 the units are disposed radially around a central electrically heated filament 15 being retained by supports 16 mounted on stem 17, carried by the glass press 18. The entire structure is mounted within a vitreous casing 19 after the fashion of an incandescent lamp or vacuum tube. The filament 15 which may be a straight wire or a coiled helix is preferably extended rectilinearly and in an axial direction within the casing 19 as indicated and is supplied with current by means of leading-in wires 20, 21, and conducting members 22, 23, in the well-known manner. Inasmuch as each current producing unit constitutes a small generator by itself any suitable system of interconnection may be used. Thus, the individual units may be connected together in series or parallel or in any suitable combination as found desirable. The output of the interconnected units is led off through conductors 26, 27 and leading-in wires 28, 29 carried by the press 18. Naturally the units may also be interconnected within the tube so as to form generator sections the output of each of which may be led off separately in the manner indicated for the combined output, suitable means being then provided to enable the outputs to be connected in series or parallel at will on the outside of the device. In the structure described the heat produced by the filament 15 is concentrated along a line parallel with the rectilinearly arranged hot junction edges of the thermopiles while the refractory cement 8 and the heat insulating support 3 tend to retard the transmission of heat to the cold junctions of the thermopile or generating unit located adjacent the walls of the glass container 19. Sufficient difference of temperature is thus produced between the hot and cold junctions to insure a proper fall in thermic potential and therefore efficient operation of the device as a thermopile.

In order to secure good thermal conduction of the heat of the filament to the hot junctions of the thermo-couple the glass receptacle instead of being evacuated may be filled with a heat conducting gas, preferably one which is incapable of attacking the metals of the thermo-couples, e. g. hydrogen or nitrogen preferably at reduced pressure.

The vitreous receptacle 19 may be provided with a base 32 similar to those used for vacuum tubes or incandescent lamps so that the device may readily be mounted in and removed from sockets of the well known type. In such a case the filament leading-in wires are attached to contacts 24 25 while the output circuit of the current producing units terminates in contacts 30 31 it being understood that additional contacts may be required if it is found desirable to bring the outputs of individual series of inter-connected current producing units to the outside of the bulb as hereinbefore recited. By thus equipping the generator with a base the same may readily be inserted in circuit with other devices on a radio panel so as to supply current for the various radio instruments. It is obvious that a number of such generators may be used and connected in series or parallel as desired to replace the batteries ordinarily used for supplying the current needed for the vacuum tubes. It is likewise apparent that a defective generator may be withdrawn with facility from its socket and replaced by a new one the procedure occasioning but momentary interruption to radio broadcast reception. The rapid and economical manner in which the current producing units of the generator may be manufactured and assembled into finished generators together with the fact that the generator itself may be operated with alternating current as well as direct and without introducing disturbing noises such as "A. C. hum" into the reception constitute further advantages of the present invention.

In practice I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in construction, proportion, thickness of metal and nature of support used together with arrangement of parts may be resorted to when required without sacrificing any of the advantages of my invention as set forth in the appended claims.

What I claim as new and desire to secure by Letters Patent of the United States is:

1. A thermal electric generator comprising a vitreous container, a filamentary heat producing body centrally disposed and extending in an axial direction within said container, a plurality of thermo-couples radially disposed in operative relation to said body and spaced therefrom, a heat-conducting gas within said container said gas being chemically inert with respect to the materials composing the thermo-couples, a base attached to one extremity of said container, terminals on said base, and conductors connecting said heat producing body and said thermo-couples to said terminals.

2. A thermo-couple current generating unit comprising a flat insulating support, a plurality of metal members disposed upon said support and attached thereto, the hot and cold junctions of said thermo-couples extending beyond the surface edge of said support and in the same plane therewith.

3. A thermo-couple current generating unit comprising a plurality of members of dissimilar metals said members being disposed in alternating relation and metallically joined with the greater portion of their bodies upon an insulating refractory support and with a lesser portion of their bodies projecting outwardly from said support, said members being joined at such projecting portions to form a plurality of rectilinearly disposed thermo-couple junctions.

4. A thermo-couple current generating unit comprising a substantially rectangular plate of insulating refractory material, a plurality of thermo-couples disposed upon said plate in permanent heat resistant relation thereto, the hot and cold junction ends of said thermo-couples projecting beyond the edges of said plate and being rectilinearly aligned parallel with the edge of and in the same plane as said plate.

5. In a thermal electric generator the combination with a casing of an electric heating element disposed within said casing, a plurality of connected thermal electric couples disposed radially around said heating element, the ends of said couple adjacent the heating element constituting the joints to be heated and the ends adjacent the casing the joints to be cooled, the said joints to be heated being disposed in a line rectilinearly adjacent the rectilinearly disposed filament, means for conducting electric current to said heating element and means for conducting electric current away from said thermocouple and a heat conducting gas within said casing to permit the heat of the filament to reach the hot ends of the thermo-couple.

6. A thermal electric generator comprising a vitreous container, a filamentary heat producing body centrally disposed and extending axially within said container, a plurality of thermo-couples radially disposed in operative relation to said body and spaced therefrom, a base attached to one extremity of said container, terminals on said base, and conductors connecting said heat producing body and said thermo-couples to said terminals.

7. A thermo-couple current generating unit comprising a flat, substantially rectangular insulating support, a plurality of members of dissimilar metals disposed in parallel and alternating spaced relation to each other upon said support and cemented thereto, the extremities of said members extending substantially beyond each edge of said support and in the same plane, said members being metallically united at said extremities in alternating order to form a zig-zag metallic structure whose one set of united projecting extremities constitutes a series of hot and whose other set a series of cold thermo-couple junctions.

8. A thermo-couple current generating unit comprising a flat, substantially rectangular support, a plurality of members of dissimilar metals disposed in parallel and alternating spaced relation to each other upon said support and cemented thereto, the extremities of said members extending substantially beyond each edge of said support and in the same plane, said members being metallically united at said extremities in alternating order to form a zig-zag structure whose one set of united projecting extremities constitutes a series of hot and whose other set a series of cold thermo-couple junctions, the said junctions being substantially aligned rectilinearly parallel with the edges of said support.

9. A thermal electric generator comprising a container, a filamentary heater mounted therein, an insulator mounted in said receptacle and having a plurality of thermocouples secured thereto, the hot junctions of said thermocouples being arranged substantially in a straight line and adjacent said heater.

10. The method of making thermo-couples consisting in disposing members of dissimilar metals in alternating parallel spaced relation to each other upon an insulating support, securing said members to said support in heat resisting insulating relation and metallically uniting said dissimilar members at their alternate extremities to form a continuous zig-zag metal structure.

11. A thermal electric generator comprising a plurality of thermo-couple current generating units each of said units being composed of flat substantially rectangular plates of heat resisting insulating material having metal members of dissimilar alloys cemented thereon in alternate parallel spaced relation, said members protruding beyond each edge of said plate and being metallically united at their protruded extremities in thermo-couple relation to form a continuous zig-zag metallic structure having a series of hot thermo-couple junctions adjacent one edge and a series of cold thermo-couple junctions adjacent the other edge each series of junctions being located along a line substantially parallel with its respective edge a central substantially rectilinear filamentary heater, said thermo-couple current generating units being disposed radially around said heater with the hot junction edges parallel and in operative relation to said heater, means for supplying heating current to said heater, and means for withdrawing the current produced by said thermo-couple generating units.

12. A thermal electric generator comprising a plurality of thermo-couple current generating units each of said units being composed of flat substantially rectangular plates of heat resisting insulating material having metal members of dissimilar alloys cemented thereto in alternate parallel spaced relation said members protruding beyond each edge of said plate and being metallically united at their protruded extremities in thermocouple relation to form a continuous zig-zag metallic structure having a series of hot thermo-couple junctions adjacent one edge and a series of cold thermo-couple junctions adjacent the other edge each series of junctions being located on a line substantially parallel with its respective edge a central filamentary heater said thermo-couple current generating units being disposed radially around said heater with the hot junction edges parallel and in operative relation to said heater, means for supplying heating current to said heater and means for withdrawing the current produced by said thermo-couple generating units.

13. A thermal electric generator comprising a plurality of thermo-couple current generating units each of said units being composed of flat substantially rectangular plates of heat resisting insulating material having metal members of dissimilar alloys cemented thereto in alternate parallel spaced relation said members protruding beyond each edge of said plate and being metallically united at their protruding extremities in thermo-couple relation to form a zig-zag continuous metallic structure having a series of hot thermo-couple junctions adjacent one edge and a series of cold thermo-couple junctions adjacent the other edge each series of junctions being located on a line substantially parallel with its respective edge, a central filamentary heater, said thermo-couple current generating units being disposed radially around said heater with the hot junction edges parallel and in operative relation to said heater, a vitreous container adapted to surround said units and said heater, base means adjacent one extremity of said container to adapt said generator for insertion into a receptacle, means for supplying current to said heater, means for withdrawing the current produced by said thermo-couple current generating units, terminals on said base means said terminals being associated in conducting relation with said current supply and current withdrawal means.

14. The method of fabricating thermo-couple current generating units comprising disposing members of dissimilar metals in alternate spaced, thermo-electrically united relation upon an insulating support, causing the thermo-couple junctions of said members to project beyond the surface of said support and uniting said metal members to said support at their non-projecting body portions.

15. The method of making thermo-couples consisting in disposing two flat members of insulating material upon opposite sides of a support, winding a layer of one thermo-electric metal around said members and said support, winding a layer of another thermo-electric metal over the first layer so that the layers will lie in alternate parallel spaced relation upon said flat members and cross each other at the faces of the support not provided with insulating members, cementing said metal layers in place upon said members and in heat resistant relation thereon, metallically uniting said metal layers at their crossed portions, separating said metal members across their metallically united portions to produce a plurality of V-shaped thermo-pile junctions disposed at right angles to each edge of each of said insulating members and bending said junctions to cause them to extend outwardly from and in the same plane with said flat members.

In witness whereof, I have hereunto set my hand this 30th day of March, 1925.

DEWEY T. SIMONDS.